United States Patent
Yamaji

(10) Patent No.: US 11,796,356 B2
(45) Date of Patent: Oct. 24, 2023

(54) SENSOR INSTALLATION STRUCTURE

(71) Applicant: Toyota Jidosha Kabushiki Kaisha, Toyota Aichi-ken (JP)

(72) Inventor: Masayuki Yamaji, Miyoshi (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 463 days.

(21) Appl. No.: 17/096,058

(22) Filed: Nov. 12, 2020

(65) Prior Publication Data

US 2021/0148737 A1    May 20, 2021

(30) Foreign Application Priority Data

Nov. 14, 2019  (JP) ................................. 2019-206548

(51) Int. Cl.
  *G01D 11/30*   (2006.01)
  *G01S 13/931*  (2020.01)
  *B62D 25/02*   (2006.01)

(52) U.S. Cl.
  CPC .......... *G01D 11/305* (2013.01); *B62D 25/02* (2013.01); *G01S 13/931* (2013.01); *G01S 2013/93274* (2020.01)

(58) Field of Classification Search
  None
  See application file for complete search history.

(56) References Cited

U.S. PATENT DOCUMENTS

| | | | | |
|---|---|---|---|---|
| 9,673,517 B2* | 6/2017 | Tran | ......................... | H01Q 1/42 |
| 10,012,720 B2* | 7/2018 | Emanuelsson | ......... | H01Q 1/528 |
| 10,173,623 B1* | 1/2019 | Meksavan | ............... | G01S 13/87 |
| 2009/0001759 A1* | 1/2009 | Kondo | .................. | B60R 19/483 |
| | | | | 296/187.03 |
| 2012/0000302 A1* | 1/2012 | Inoue | ...................... | G01S 7/521 |
| | | | | 73/866.5 |
| 2012/0200121 A1* | 8/2012 | Wuerfel | ................ | B60R 19/483 |
| | | | | 296/193.09 |
| 2013/0050034 A1* | 2/2013 | Wu | ...................... | H01Q 1/3233 |
| | | | | 343/872 |
| 2014/0070982 A1* | 3/2014 | Inada | .................... | B60R 19/483 |
| | | | | 342/385 |

(Continued)

FOREIGN PATENT DOCUMENTS

JP    2016-037110 A    3/2016
JP    2016-179752 A    10/2016

(Continued)

*Primary Examiner* — Peter M Bythrow
(74) *Attorney, Agent, or Firm* — Dinsmore & Shohl LLP

(57) ABSTRACT

A sensor installation structure includes: an exterior panel provided at a side part of a vehicle; an installation surface arranged at a location recessed inward in the vehicle width direction from a general surface of the exterior panel; a connecting surface connecting between a peripheral edge of the installation surface and the general surface; and a surroundings information sensor that detects surroundings information of the vehicle and that is located inward in the vehicle width direction from the installation surface. The connecting surface, in elevating from the peripheral edge of the installation surface toward the general surface, slopes so as to extend outward in the surface direction when viewed from the installation surface.

6 Claims, 7 Drawing Sheets

(56) References Cited

U.S. PATENT DOCUMENTS

| | | | |
|---|---|---|---|
| 2014/0111950 A1* | 4/2014 | Yamasaki | B60R 16/0239 |
| | | | 361/747 |
| 2014/0158731 A1* | 6/2014 | Squire | B60R 11/04 |
| | | | 224/545 |
| 2016/0023624 A1* | 1/2016 | Schaaf | B60R 19/03 |
| | | | 427/8 |
| 2016/0282155 A1* | 9/2016 | Hara | G01D 11/30 |
| 2016/0297437 A1* | 10/2016 | Hara | G01S 7/4813 |
| 2017/0297521 A1* | 10/2017 | Sugie | G01S 15/931 |
| 2018/0203110 A1* | 7/2018 | Watanabe | G01S 7/027 |
| 2019/0256009 A1* | 8/2019 | Miwa | G01S 13/931 |
| 2020/0096612 A1* | 3/2020 | Otoyo | F16J 15/52 |
| 2020/0156576 A1* | 5/2020 | Kataoka | B60R 19/483 |
| 2020/0172020 A1* | 6/2020 | Nakayama | B60R 11/00 |

FOREIGN PATENT DOCUMENTS

| | | |
|---|---|---|
| JP | 2019-034639 A | 3/2019 |
| JP | 2019-142326 A | 8/2019 |

\* cited by examiner

SENSOR INSTALLATION STRUCTURE

CROSS REFERENCE TO RELATED APPLICATION

This application claims priority to Japanese Patent Application No. 2019-206548 filed on Nov. 14, 2019, which is incorporated herein by reference in its entirety including the specification, claims, drawings, and abstract.

TECHNICAL FIELD

The present specification discloses a sensor installation structure in which a surroundings information sensor that detects surroundings information regarding a vehicle is mounted to a side part of the vehicle.

BACKGROUND

In recent years, in order to enhance vehicle safety and to execute some driving tasks automatically on the part of the vehicle, it has been suggested to mount, to side parts of a vehicle, surroundings information sensors that detect surroundings information.

For example, JP 2016-37110 A suggests mounting cameras on respective left and right front fenders of a vehicle. The cameras are installed so as to be oriented diagonally rearward, and images captured by the cameras are displayed in real time on a monitor provided in the vehicle cabin. By providing sensors such as these cameras at side parts of a vehicle, information useful for safety enhancement and automated driving can be acquired.

However, according to the technology of JP 2016-37110 A 1, a rear viewing device including cameras protrudes outward from the front fenders. In other words, the technology of JP 2016-37110 A has room for improvement with regard to aerodynamic performance.

In light of the above, the present specification discloses a sensor installation structure which enables detection of vehicle surroundings information and which, at the same time, enables suppression of degradation in aerodynamic performance.

SUMMARY

A sensor installation structure disclosed in the present specification includes: an exterior panel provided at a side part of a vehicle; an installation surface arranged at a location recessed inward in a vehicle width direction from a general surface of the exterior panel; a connecting surface connecting between a peripheral edge of the installation surface and the general surface; and a surroundings information sensor that detects surroundings information of the vehicle and that is located inward in the vehicle width direction from the installation surface, wherein the connecting surface, in elevating from the peripheral edge of the installation surface toward the general surface, slopes so as to extend outward in a surface direction when viewed from the installation surface.

By having the surroundings information sensor located inward in the vehicle width direction from the installation surface that is arranged at a recessed location, the surroundings information sensor does not protrude outward. Further, by forming the connecting surface to be sloped, an air flow along the exterior panel provided at the side part of the vehicle is rectified, so that an increase in aerodynamic resistance caused due to the recess in the exterior panel can be effectively suppressed.

In the above-described sensor installation structure, the connecting surface may include a front connecting surface that is located on a vehicle front side of the installation surface and that, in elevating from the peripheral edge of the installation surface toward the general surface, slopes so as to extend in the vehicle front direction; and a rear connecting surface that is located on a vehicle rear side of the installation surface and that, in elevating from the peripheral edge of the installation surface toward the general surface, slopes so as to extend in the vehicle rear direction. An elevation angle of the rear connecting surface relative to the general surface may be smaller than an elevation angle of the front connecting surface relative to the general surface.

By configuring as described above, a bend in an air flow flowing from the installation surface along the rear connecting surface becomes reduced, and the air flow becomes smoother. This results in enhancing the vehicle aerodynamic performance.

Further, a width, in a vehicle longitudinal direction, of the rear connecting surface may be larger than a width of the front connecting surface.

By configuring as such, the installation surface can be formed sufficiently recessed from the general surface while limiting the elevation angle of the rear connecting surface to a small value. This can effectively prevent interference of other parts with the surroundings information sensor.

Further, an amount of elevation of the rear connecting surface may be smaller than an amount of elevation of the front connecting surface.

By configuring as such, aerodynamic resistance generated when an air flow passes over the installation surface at the time of vehicle travel can be reduced.

Further, a front end side of the front connecting surface may slant toward the rear while extending downward.

By configuring as such, the air flow at the time of vehicle travel flows toward the rear while being rectified, so that the aerodynamic performance becomes enhanced compared to a case in which the front end side is parallel to a vehicle vertical direction.

Further, the exterior panel may include: a fender panel; and an additional panel that is attached to an outward side, in the vehicle width direction, of the fender panel and in which the installation surface and the connecting surface are formed. A fastening hole for fastening the surroundings information sensor may be formed in a portion of the fender panel that is to be covered by the additional panel.

By configuring as such, the fastening hole becomes covered by the additional panel and becomes visually unrecognizable from the outside, so that vehicle designability can be enhanced.

According to the sensor installation structure disclosed in the present specification, degradation in aerodynamic performance can be suppressed while enabling detection of vehicle surroundings information.

BRIEF DESCRIPTION OF DRAWINGS

Embodiment(s) of the present disclosure will be described based on the following figures, wherein.

DESCRIPTION OF EMBODIMENTS

Figure 1:
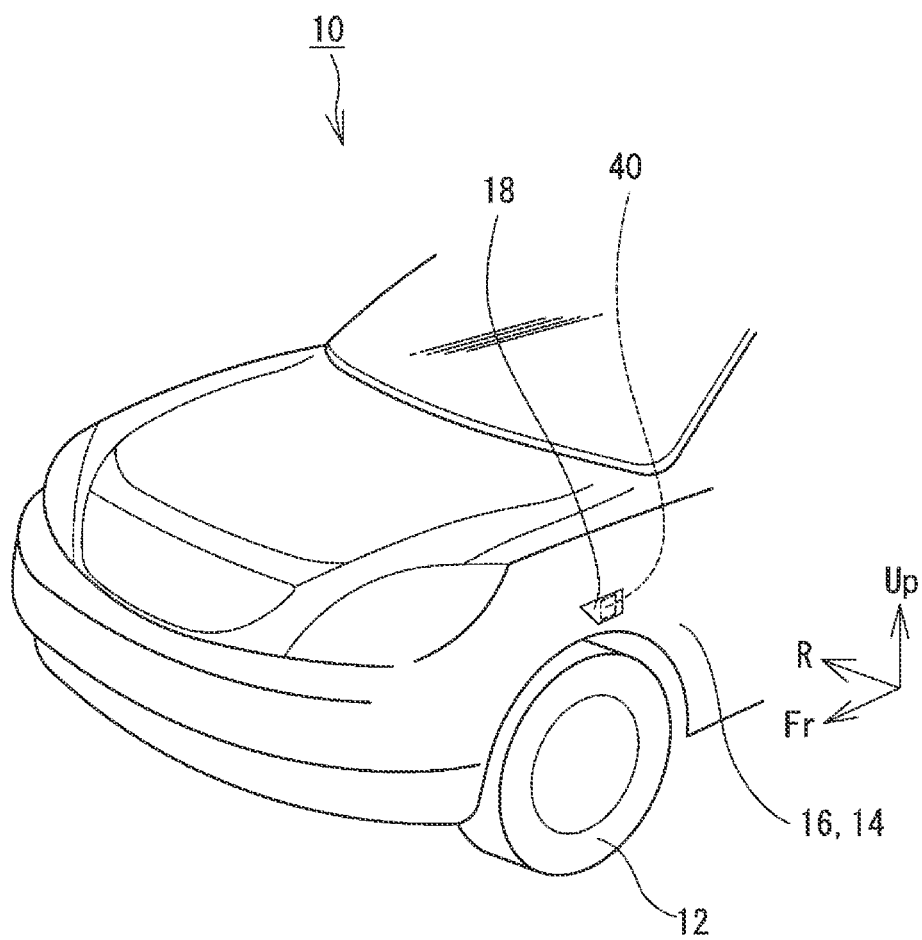
FIG. 1 is a perspective view of a vehicle as seen from the front.

A sensor installation structure is described below by reference to the drawings. FIG. 1 is a perspective view of a vehicle 10 as seen from the front. In the drawings noted below, "Fr", "Up", and "R" respectively denote the vehicle front direction, the vehicle upward direction, and the vehicle right direction.

The vehicle 10 has a drive assist function or an automated driving function. Here, the "drive assist" function is a function in which the vehicle 10 carries out some of dynamic driving tasks, and corresponds to, for example, level 1 or level 2 defined by the Society of Automotive Engineers (SAE) in the U.S. In level 1, the vehicle 10 assists either one of steering or acceleration/deceleration. In level 2, the vehicle 10 assists both of steering and acceleration/deceleration in a coordinated manner to support driving. Further, the "automated driving" function is a function in which the vehicle carries out almost all of the dynamic driving tasks, and corresponds to, for example, levels 3 to 5 defined by SAE. Level 3 is a drive mode in which, at specific sites such as highways, all of the dynamic driving tasks are automated but operation by a driver is required in emergencies. Further, level 4 is a drive mode in which, at specific sites only, all of the dynamic driving tasks are automated and emergency operations are also automatically processed. Level 5 is a drive mode in which automated driving is possible under almost all conditions without limitation of sites or the like, and signifies so-called "fully automated driving".

In order to realize drive assist or automated driving, the vehicle 10 is equipped with a surroundings information sensor 40. The surroundings information sensor 40 is a sensor that detects a state of the surroundings of the vehicle 10. The surroundings information sensor 40 includes, for example, an image sensor (such as a Charge-Coupled Device (CCD) sensor or Complementary Metal Oxide Semiconductor (CMOS) sensor), and may be a camera that captures images of the surroundings of the vehicle 10. The surroundings information sensor 40 may alternatively be a sensor that detects objects located around the vehicle by transmitting and receiving electromagnetic waves. Examples of such a sensor include a millimeter-wave radar which uses millimeter waves, an infrared laser radar which uses infrared laser, and a lidar which uses laser light emitted in pulse form. Further, the surroundings information sensor 40 may be a sensor that detects objects located around the vehicle 10 by transmitting and receiving ultrasonic waves, such as a clearance sonar. The number and types of the surroundings information sensor 40 mounted on a single vehicle 10 are not particularly limited so long as one or more surroundings information sensors 40 of one or more types are provided. The following description refers to an example case in which a lidar is mounted as the surroundings information sensor 40.

In the present embodiment, as shown in FIG. 1, one surroundings information sensor 40 is mounted to an external panel 14 provided at a side part of the vehicle 10. This external panel 14 includes a fender panel 16 and an additional panel 18 attached to the fender panel 16, as described further below. In the present embodiment, the surroundings information sensor 40 is arranged at a position above a front wheel 12, as shown in FIG. 1. A control unit (not shown) of the vehicle 10 determines presence or absence of objects around the vehicle 10 based on the results of detection by this surroundings information sensor 40 (in the present embodiment, a lidar). Based on the determined result, the control unit controls at least one of steering and acceleration/deceleration of the vehicle 10, notifies any alarm (for example, when there is a risk of colliding with an object, an alarm for giving a warning in that regard) to the driver, and so on.

Figure 2:
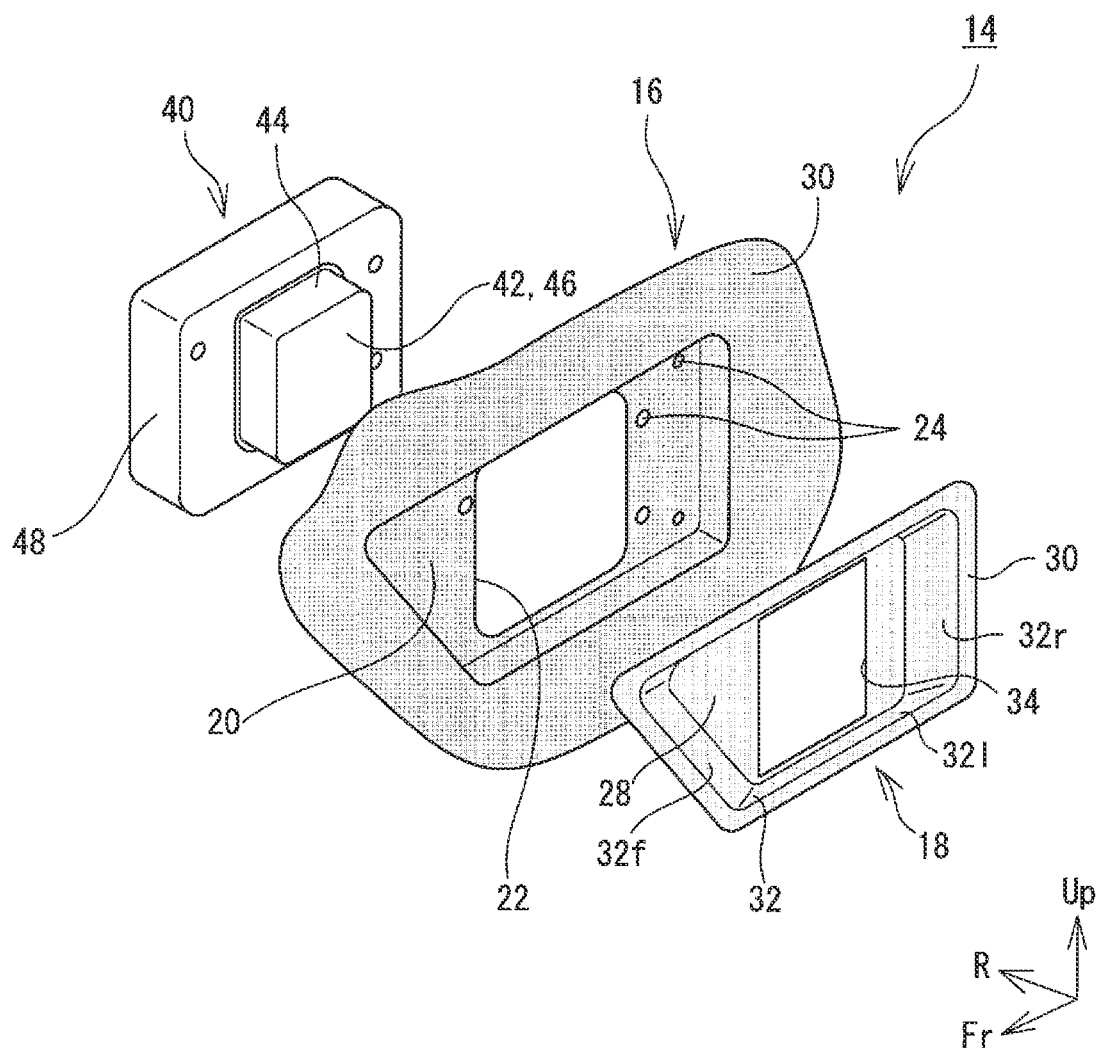
FIG. 2 is an exploded perspective view showing how a surroundings information sensor is installed.
Figure 3:
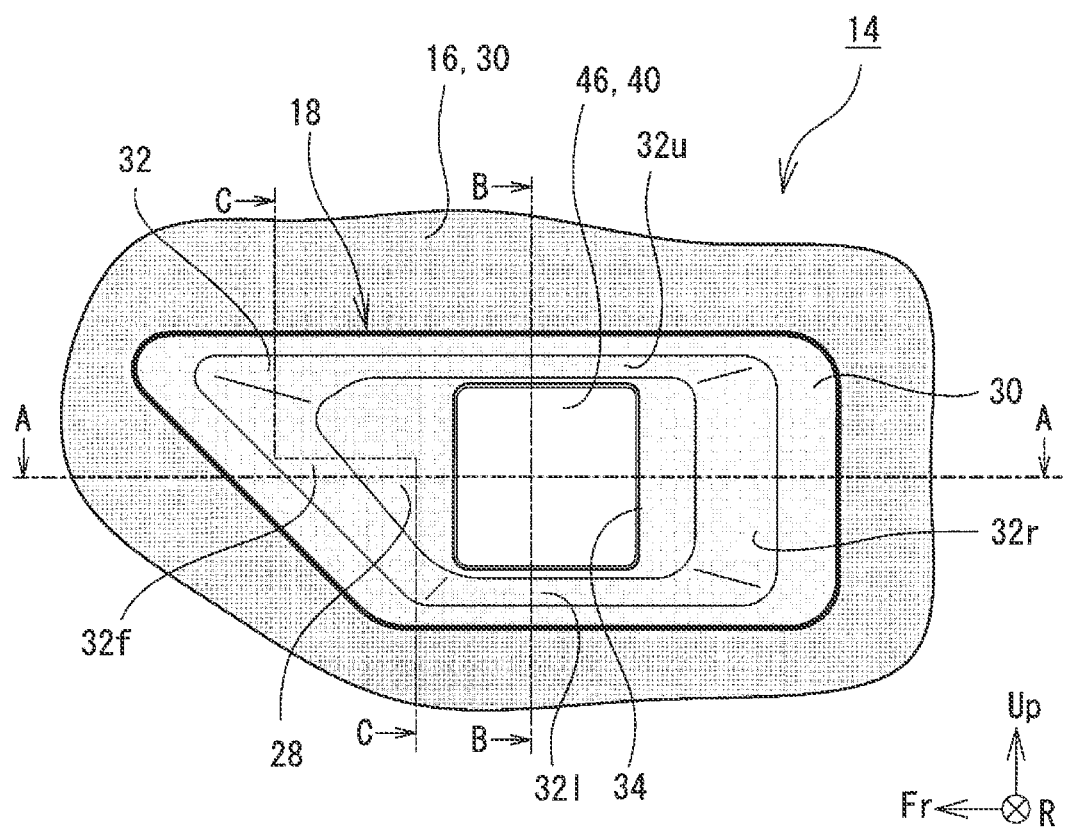
FIG. 3 is a diagram showing an area around the surroundings information sensor as seen from a lateral side of the vehicle.
Figure 4:
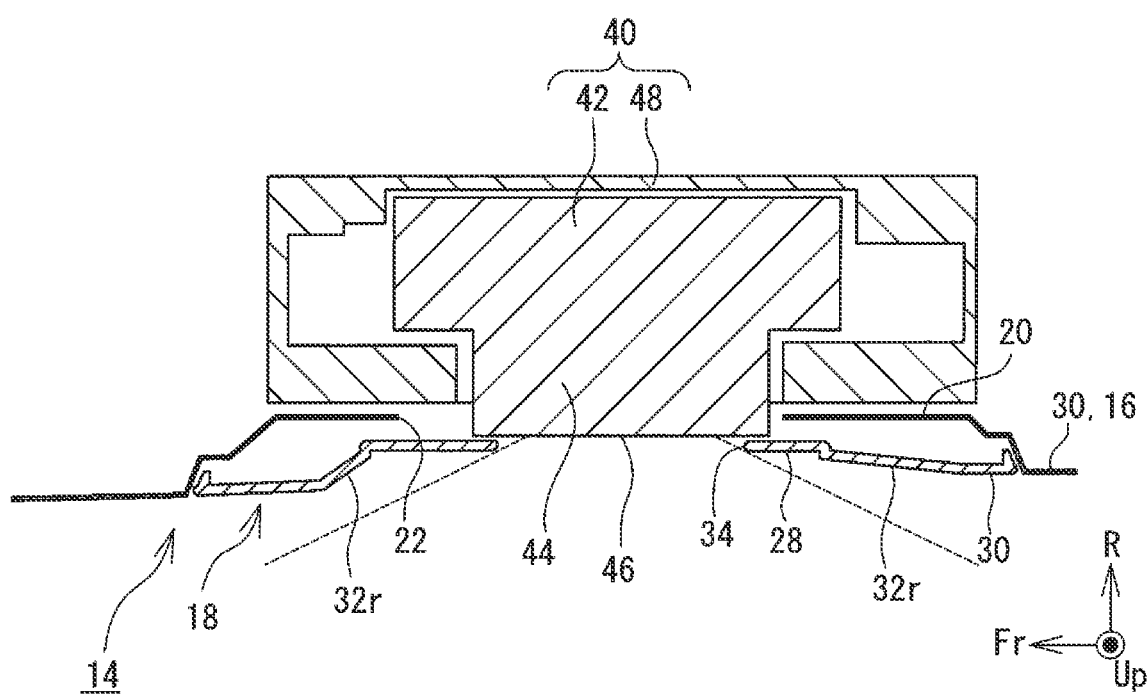
FIG. 4 is a cross-sectional view taken along A-A in FIG. 3.
Figure 5:
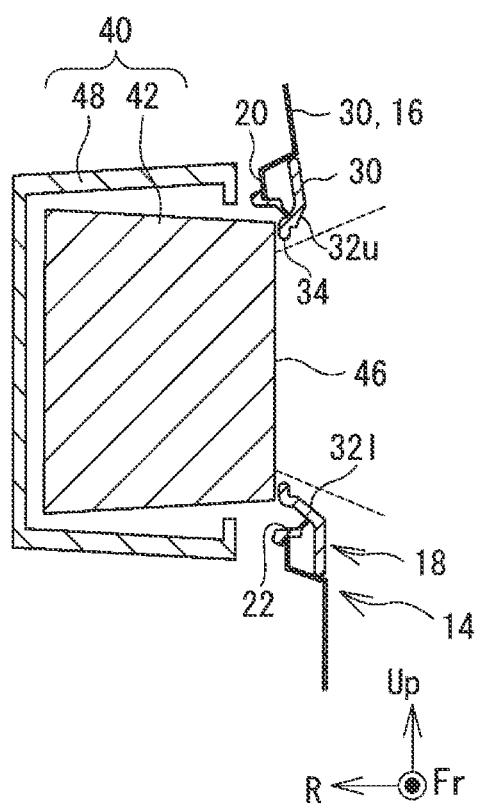
FIG. 5 is a cross-sectional view taken along B-B in FIG. 3.
Figure 6:
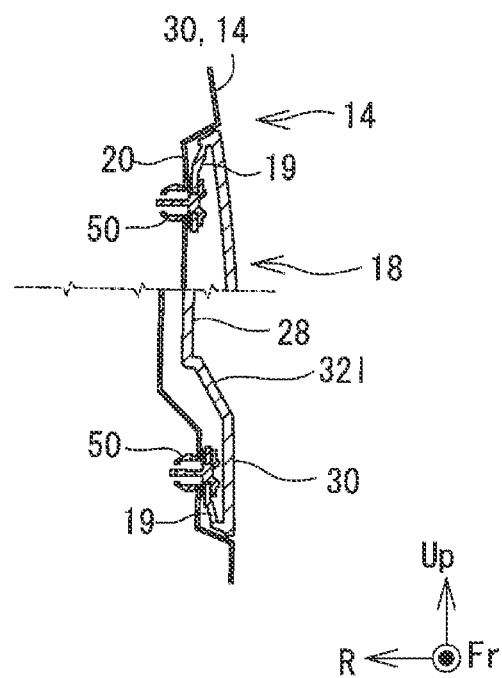
FIG. 6 is a cross-sectional view taken along C-C in FIG. 3.
Figure 7:
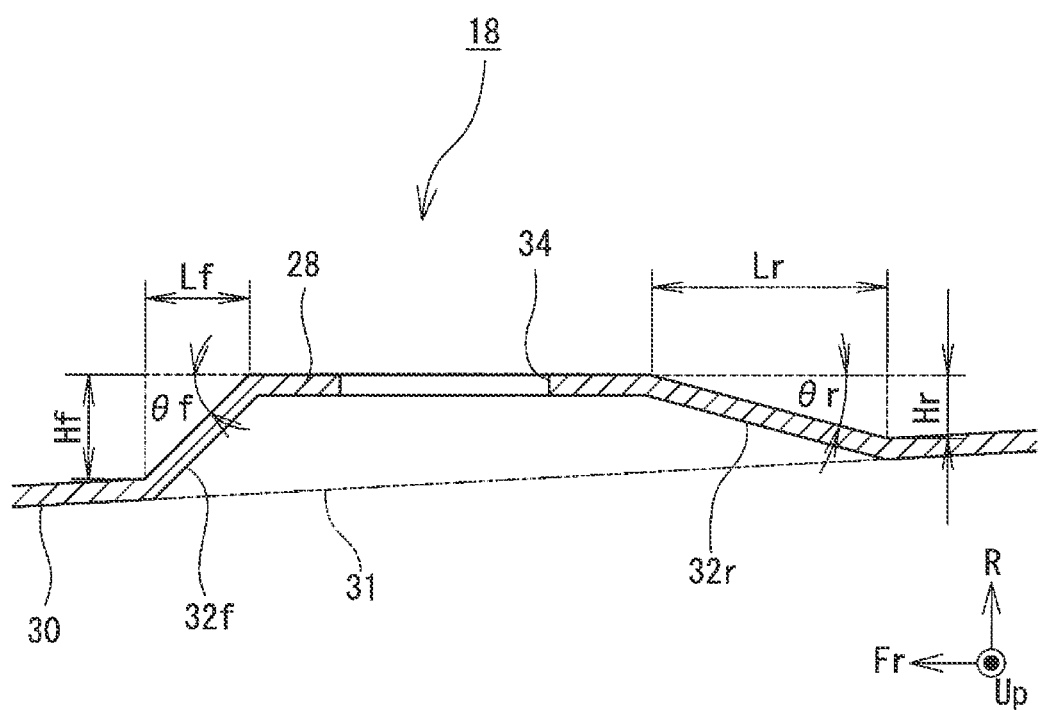
FIG. 7 is a schematic diagram explaining various dimensions of an additional panel.

Installation of the surroundings information sensor 40 will now be described by reference to FIGS. 2 to 7. FIG. 2 is an exploded perspective view showing how a surroundings information sensor is installed. FIG. 3 is a diagram showing an area around the surroundings information sensor 40 as seen from a lateral side of the vehicle 10. Further, FIG. 4 is a cross-sectional view taken along A-A in FIG. 3, FIG. 5 is a cross-sectional view taken along B-B in FIG. 3, and FIG. 6 is a cross-sectional view taken along C-C in FIG. 3. Furthermore, FIG. 7 is a schematic diagram explaining various dimensions of the additional panel 18. In FIGS. 3 and 4, in order to clearly indicate the positions of openings and holes, the fender panel 16 is depicted with dark gray shading, while the additional panel 18 is depicted with light gray shading.

As noted above, the exterior panel 14 includes the fender panel 16 and the additional panel 18. The fender panel 16 and the additional panel 18 are both formed by shaping a metallic panel. As shown in FIG. 2, the additional panel 18 is to be attached to an outer surface of the fender panel 16. In an area of the fender panel 16 that is to be overlapped by the additional panel 18, a retracted portion 20 that is recessed inward in the vehicle width direction is provided in order to avoid interference with the additional panel 18. The outer peripheral shape of this retracted portion 20 is nearly identical to the outer peripheral shape of the additional panel 18. In other words, the retracted portion 20 has a substantially trapezoidal shape having its front end side slanting toward the rear while extending downward.

A retracted opening 22 is formed approximately at the center of the retracted portion 20, allowing a projection 44 (described below) of the surroundings information sensor 40 to pass therethrough. Further, in the retracted portion 20, a plurality of clip holes 24 are formed, through which fastening clips 50 (not shown in FIG. 2; see FIG. 6) are inserted. The fastening clips 50 are used for fastening the surroundings information sensor 40 and the additional panel 18.

The additional panel 18 is a panel member that is to be attached to the fender panel 16 via fastening members such as the fastening clips 50. This additional panel 18 is shaped so that its central part is recessed inward in the vehicle width direction. This recessed surface serves as the installation surface 28. In an area peripheral to the installation surface 28, a general surface 30 that smoothly continues to the fender panel 16 is provided. Further, between the installation surface 28 and the general surface 30, there extend a front connecting surface 32f, rear connecting surface 32r, upper connecting surface 32u, and lower connecting surface 32l, which connect between the two surfaces 28 and 30. In the following description, when no distinction is to be made among the front, rear, upper, and lower connecting surfaces, these connecting surfaces are referred to as "connecting surface 32" with the suffix alphabet character omitted.

The installation surface 28 is a substantially planar surface. This installation surface 28 has a substantially trapezoidal shape having its front end side slanting toward the rear while extending downward. The outer shape of the connecting surface 32 described below and the outer shape of the additional panel 18 are shapes obtained by substantially offsetting the installation surface 28 outward, and the front end side of each of these outer shapes slants toward the rear as it extends downward. At the center of the installation surface 28, an exposing opening 34 is formed, for exposing a detection surface 46 (described below) of the surroundings information sensor 40 to the outside. This exposing opening 34 in the present embodiment is substantially rectangular, as shown in FIG. 2. In a state in which the additional panel 18 is attached to the fender panel 16, when the exposing opening 34 is viewed from the lateral side of the vehicle 10, the exposing opening 34 is located at a position overlapping the retracted opening 22 of the fender panel 16. The exposing opening 34 is slightly smaller than the outer peripheral shape of the detection surface 46. Further, the retracted opening 22 of the fender panel 16 is sufficiently larger than the outer peripheral shapes of the exposing opening 34 and the detection surface 46.

The connecting surface 32 can be divided into: the front connecting surface 32f extending from the front end side of the installation surface 28 toward the vehicle front; the rear connecting surface 32r extending from the rear end side of the installation surface 28 toward the vehicle rear; the upper connecting surface 32u extending from the upper end side of the installation surface 28 upward of the vehicle; and the lower connecting surface 32l extending from the lower end side of the installation surface 28 downward of the vehicle. Each of these connecting surfaces 32, in elevating from the peripheral edge of the installation surface 28 toward the general surface 30, slopes so as to extend outward in the surface direction when viewed from the installation surface 28. In other words, as shown in FIG. 4, the front connecting surface 32f extends from a front end edge of the installation surface 28 outward in the vehicle width direction and also toward the vehicle front. Similarly, the rear connecting surface 32r extends from a rear end edge of the installation surface 28 outward in the vehicle width direction and also toward the vehicle rear. Further, as shown in FIG. 5, the upper connecting surface 32u extends from an upper end edge of the installation surface 28 outward in the vehicle width direction and also upward of the vehicle. The lower connecting surface 32l extends from a lower end edge of the installation surface 28 outward in the vehicle width direction and also downward of the vehicle.

As shown in FIG. 6, arm members 19 extend from the back face of the additional panel 18. A clip hole is formed in each arm member 19, and a fastening clip 50 is inserted through this clip hole. The additional panel 18 is attached to the fender panel 16 via this fastening clip 50.

The surroundings information sensor 40 is positioned inward in the vehicle width direction from the installation surface 28. As shown in FIG. 2, the surroundings information sensor 40 includes a substantially box-shaped sensor frame 48 and a sensor body 42 held by the sensor frame 48. The sensor frame 48 has formed therein a plurality of holes through which fastening clips 50 are inserted. The sensor frame 48 is attached to the retracted portion 20 of the fender panel 16 by the fastening clips 50 inserted through these holes and the clip holes 24.

The sensor body 42 includes a projection 44 that projects outside of the sensor frame 48. As shown in FIG. 2, in the present embodiment, the projection 44 has a shape of a quadrangular prism, and its tip end face serves as the detection surface 46 that transmits or receives signals (such as electromagnetic signals, ultrasonic signals, visible light, etc.) for detection. Here, dashed lines in FIGS. 4 and 5 indicate the directivity angle of the signals for detection. When the surroundings information sensor 40 is attached to the fender panel 16, the detection surface 46 is positioned directly facing the exposing opening 34. In other words, the detection surface 46 is exposed to the outside via the exposing opening 34. As a result, the signals for detection can be emitted from the detection surface 46 or be incident on the detection surface 46.

As will be apparent from the above description, in the present embodiment, the surroundings information sensor 40 is positioned inward in the vehicle width direction from the general surface 30, and does not project outward in the vehicle width direction from the general surface 30. For this reason, the aerodynamic performance of the vehicle 10 can be improved compared to conventional art in which a sensor is positioned to project outward in the vehicle width direction.

Here, if it is only intended to simply improve the aerodynamic performance, it would be sufficient to simply arrange the surroundings information sensor 40 at a location inward in the vehicle width direction from the general surface 30, and a recessed portion (i.e., the installation surface 28) may be not provided in the exterior panel 14. However, if such a configuration is to be adopted, the detection surface 46 would be located in substantially the same plane as the general surface 30, so that the detection surface 46 would be more easily exposed to rain and dust, which would possibly lead to degradation in detection accuracy. Further, if the detection surface 46 is in substantially the same plane as the general surface 30, when the fender panel 16 collides with an obstacle (such as a tree branch, a person's finger, etc.), the obstacle would likely also contact the detection surface 46 and possibly damage the detection surface 46.

In contrast, according to the present embodiment, the installation surface 28 is provided at a location recessed from the general surface 30 in the vehicle width direction, and the surroundings information sensor 40 is arranged on the inner side of this installation surface 28, as described above. With this arrangement, the detection surface 46 of the surroundings information sensor 40 is less easily exposed to rain and dust as well as obstacles, so that accuracy degradation and damage in the surroundings information sensor 40 can be effectively prevented.

Further, as will be apparent from the above description, in the present embodiment, the additional panel 18 is provided at a position that overlaps the surroundings information sensor 40 in side view, and a recessed portion is formed in this additional panel 18. Furthermore, this additional panel 18 is attached to the outer face of the fender panel 16, thereby giving a configuration such that part of the fender panel 16 is covered by the additional panel 18. With this configuration, the clip holes 24 and the clips 50 for attaching the surroundings information sensor 40 to the fender panel 16 can be easily concealed. As a result, designability of the vehicle 10 can be enhanced.

Here, if a recessed portion (i.e., the installation surface 28) is provided in the fender panel 16, this recessed portion would possibly increase the aerodynamic resistance caused when air flows from the vehicle front toward the rear, which would degrade the aerodynamic performance of the vehicle 10. In the present embodiment, in order to suppress degradation in the aerodynamic performance of the vehicle 10, the front connecting surface 32f and the rear connecting surface 32r are configured to, in elevating from the peripheral edge of the installation surface 28 toward the general surface 30, slope so as to extend outward in the surface direction when viewed from the installation surface 28. With this configuration, an air flow moving along the side part of the vehicle 10 becomes rectified, so that degradation in the aerodynamic performance of the vehicle 10 can be effectively suppressed.

Further, in the present embodiment, as shown in FIGS. 4 and 7, the elevation angle θr of the rear connecting surface 32r relative to the installation surface 28 is configured smaller than the elevation angle θf of the front connecting surface 32f relative to the installation surface 28. By configuring the elevation angle θr of the rear connecting surface 32r smaller, a bend in an air flow flowing from the installation surface 28 along the rear connecting surface 32r becomes reduced, and the air flow becomes smoother. This results in enhancing the vehicle aerodynamic performance.

Furthermore, in the present embodiment, the width Lr, in the vehicle longitudinal direction, of the rear connecting surface 32r is configured larger than the width Lf of the front connecting surface 32f. By configuring the width Lr of the rear connecting surface 32r larger, the installation surface 28 can be formed sufficiently recessed from the general surface 30 while limiting the elevation angle θr of the rear connecting surface 32r to a small value. This can effectively prevent interference of other parts with the surroundings information sensor 40.

Further, in the present embodiment, when the dimension of the front connecting surface 32f or the rear connecting surface 32r in the vehicle width direction is referred to as an "amount of elevation", the amount of elevation Hr of the rear connecting surface 32r is configured smaller than the amount of elevation Hf of the front connecting surface 32f. From a different perspective, this signifies that, with respect to a general surface 30 that would have existed if the installation surface 28 were not formed (hereinafter referred to as the "virtual general surface 31"), the installation surface 28 is sloped so that, as the installation surface 28 extends further toward the vehicle rear, it approaches closer to the virtual general surface 31. By limiting the amount of elevation Hr of the rear connecting surface 32r to a small value in this manner, the air flow becomes smoother and the aerodynamic performance of the vehicle 10 becomes more enhanced.

Furthermore, as will be apparent from FIG. 3 and the like, in the present embodiment, the front end side of the front connecting surface 32f slants toward the rear while extending downward. By configuring as such, when the air flow moving along the general surface 30 at the time of vehicle travel flows toward the installation surface 28, the air flow proceeds rearward while being rectified, so that the aerodynamic performance of the vehicle 10 can be enhanced compared to a case in which the front end side is not slanted.

The configuration described above is simply one example. So long as there is provision of the installation surface 28 that is recessed inward in the vehicle width direction from the general surface 30, as well as the sloped connection surfaces 32, other structures may be modified. Accordingly, although the fender panel 16 and the additional panel 18 are overlapped in the vehicle width direction in the present embodiment, it is alternatively possible to not provide the additional panel 18 and to form the installation surface 28 and the connection surfaces 32 in the fender panel 16.

Further, so long as the connection surfaces 32, in elevating from the peripheral edge of the installation surface 28 toward the general surface 30, slope so as to extend outward in the surface direction when viewed from the installation surface 28, the shapes of the installation surface 28 and the connection surfaces 32 may be changed as appropriate. Accordingly, instead of being trapezoidal, the installation surface 28 may alternatively be square, rectangular, oval, or the like. Furthermore, although the surroundings information sensor 40 is mounted at a location near the front fender panel 16 in the present embodiment, the surroundings information sensor 40 may be mounted at a different location so long as the location is in a side part of the vehicle 10. For example, the installation surface 28 and the like may be provided in the rear fender panel located above the rear wheel, and the surroundings information sensor 40 may be installed on the inside of this rear fender panel.

REFERENCE SIGNS LIST 10 vehicle; 12 front wheel; 14 exterior panel; 16 fender panel; 18 additional panel; 20 retracted portion; 22 retracted opening; 24 clip hole; 28 installation surface; 30 general surface; 31 virtual general surface; 32 connecting surface; 32f front connecting surface; 32l lower connecting surface; 32r rear connecting surface; 32u upper connecting surface; 34 exposing opening; 40 surroundings information sensor; 44 projection; 46 detection surface; 48 sensor frame; 50 fastening clip.

The invention claimed is:

1. A sensor installation structure, comprising:
an exterior panel provided at a side part of a vehicle, the exterior panel including:
   a fender panel; and
   an additional panel that is attached to an outward side, in a vehicle width direction, of the fender panel;
an installation surface arranged at a location recessed inward in the vehicle width direction from a general surface of the exterior panel;
a connecting surface connecting between a peripheral edge of the installation surface and the general surface;
a surroundings information sensor that detects surroundings information of the vehicle and that is located inward in the vehicle width direction from the installation surface; and
a fastening hole for fastening the surroundings information sensor is formed in a portion of the fender panel which portion is to be covered by the additional panel, wherein
the connecting surface, in elevating from the peripheral edge of the installation surface toward the general surface, slopes so as to extend outward in a surface direction when viewed from the installation surface, wherein
the installation surface and the connecting surface are formed in the additional panel.

2. The sensor installation structure according to claim 1, wherein the connecting surface includes:
a front connecting surface that is located on a vehicle front side of the installation surface and that, in elevating from the peripheral edge of the installation surface toward the general surface, slopes so as to extend in a vehicle front direction; and
a rear connecting surface that is located on a vehicle rear side of the installation surface and that, in elevating from the peripheral edge of the installation surface toward the general surface, slopes so as to extend in a vehicle rear direction, wherein an elevation angle of the rear connecting surface relative to the general surface is smaller than an elevation angle of the front connecting surface relative to the general surface.

3. The sensor installation structure according to claim 2, wherein a width of the rear connecting surface, in a vehicle longitudinal direction, is larger than a width of the front connecting surface.

4. The sensor installation structure according to claim 2, wherein an amount of elevation of the rear connecting surface is smaller than an amount of elevation of the front connecting surface.

5. The sensor installation structure according to claim 2, wherein a front end side of the front connecting surface slants toward the rear while extending downward.

6. The sensor installation structure according to claim 1, wherein the installation surface is substantially parallel to a vehicle longitudinal direction;

the fender panel has a retracted portion that is recessed inward in the vehicle width direction;

the fastening hole is formed in the retracted portion;

an exposing opening for exposing a detection surface of the surroundings information sensor to the outside is formed at a center of the installation surface;

the additional panel is attached to an outer surface of the retracted portion with the exposing opening overlapping the fastening hole; and the additional panel is exposed to the outside of the vehicle.

* * * * *